United States Patent [19]

Kelley

[11] Patent Number: 5,617,558
[45] Date of Patent: Apr. 1, 1997

[54] METHOD OF EXECUTING A SERIES OF COMPUTER CODE OPERATIONS THAT MUST BE COMPLETED WITHOUT INTERRUPTION BY A PAGE FAULT DURING EXECUTION

[75] Inventor: Michael H. Kelley, Raleigh, N.C.

[73] Assignee: Data General Corporation, Westboro, Mass.

[21] Appl. No.: 466,334

[22] Filed: Jun. 6, 1995

Related U.S. Application Data

[63] Continuation of Ser. No. 3,602, Jan. 13, 1993, which is a continuation of Ser. No. 424,184, Oct. 19, 1989, abandoned.

[51] Int. Cl.$^6$ .................................................... G06F 9/44
[52] U.S. Cl. ................... 395/493; 395/420; 395/421.03; 395/421.05; 395/492
[58] Field of Search ......................... 395/421.03, 421.05, 395/492, 420, 493

[56] References Cited

U.S. PATENT DOCUMENTS

| | | | |
|---|---|---|---|
| 3,800,291 | 3/1974 | Cocke et al. | 395/412 |
| 3,898,623 | 8/1975 | Cormier | 395/879 |
| 4,047,243 | 9/1977 | Dijkstra | 395/725 |
| 4,429,363 | 1/1984 | Duke et al. | 395/250 |
| 4,466,059 | 8/1984 | Bastian et al. | 395/250 |
| 4,499,539 | 2/1985 | Vosacek | 395/600 |
| 4,631,661 | 12/1986 | Eibach et al. | 395/182.08 |
| 4,761,737 | 8/1988 | Duvall et al. | 395/419 |
| 4,774,659 | 9/1988 | Smith et al. | 395/418 |
| 4,841,439 | 6/1989 | Nishikawa et al. | 395/375 |
| 4,868,738 | 9/1989 | Kish et al. | 395/846 |
| 4,970,641 | 11/1990 | Hester et al. | 395/733 |
| 5,003,458 | 3/1991 | Yamaguchi et al. | 395/375 |
| 5,016,169 | 5/1991 | Koya et al. | 395/800 |
| 5,063,497 | 11/1991 | Cutler et al. | 395/800 |
| 5,119,483 | 6/1992 | Madden et al. | 395/375 |

FOREIGN PATENT DOCUMENTS

| | | |
|---|---|---|
| 0212791A1 | 10/1987 | European Pat. Off. . |
| WO8402410 | 6/1984 | WIPO . |

OTHER PUBLICATIONS

*Computer Architecture and Organization*, John P. Hayes, McGraw–Hill, 1988, pp. 45 and 46.
Japanese Opposition filed Sep. 8, 1994, dispatched from the Japanese Patent Office on May 16, 1995. Full English translation enclosed.
Reference entitled "FACOM OS IV/X8 —Manual for a System Programmer," Jul., 1979. Partial English translation enclosed.

*Primary Examiner*—Reba I. Elmore
*Attorney, Agent, or Firm*—Van Dyke, Gardner, Linn & Burkhart, LLP

[57] ABSTRACT

The time lost in unnecessarily checking for the presence of all memory references required by a special section of code in an operating system before the program is run and which dynamically protects the program requiring the memory reference from crashing if the memory reference is not presently available is substantially reduced. The method assumes that all memory references are available and begins running the special section of code. If a request is made for information not in assigned memory storage, the data processing system interrupts the running of the special section of code and undoes everything the special section of code has done prior to the interrupt. The requested memory reference is then located in storage. The information is retrieved and written into assigned memory. The special section of code is then restarted and supplied the needed information. It has been found that it takes much less time to assume the memory references will succeed and occasionally interrupt, erase and restart, than to make a time-consuming preliminary check for all memory references.

16 Claims, 2 Drawing Sheets

METHOD OF EXECUTING A SERIES OF COMPUTER CODE OPERATIONS THAT MUST BE COMPLETED WITHOUT INTERRUPTION BY A PAGE FAULT DURING EXECUTION

This is a continuation of application Ser. No. 08/003,602, filed Jan. 13, 1993, which is a continuation of application Ser. No. 07/424,184, filed Oct. 19, 1989, abandoned.

BACKGROUND OF THE INVENTION

The memory of a computer is frequently divided into pages or page frames. When a program is to be run, it is assigned a certain number of available pages of memory. As the program runs, it makes reference to memory for information, data or subroutines. Some programs or special sections of code, commonly referred to as "subroutines," in a program require that all information, data and subroutines, hereinafter memory references, to be requested be in assigned available memory in order for the special section of code to operate. In the event the special section of code makes such a memory reference, and the reference is not available in the assigned memory, the program undergoes a page fault and an error occurs. In order to avoid this error condition, it is common practice to do a preliminary check to make sure that all required memory references are available to the program before it is run. All of the memory references are then marked or wired into assigned memory so they cannot be erased or moved out of memory before the special section of code is run. The running of this check program requires an extended period of time, much of which is wasted since more often than not all of the requested memory references are available. More time is lost after the program is run in going back through the memory unmarking or unwiring all of the memory references.

It is therefore an object of the present invention to be able to operate a program or special section of code which requires the presence of all memory references in order to avoid a page fault without the time loss involved in running a check program beforehand.

It is also an object of the present invention to provide a data processing system and method of operation which assumes that all memory references to be requested are present, since more often than not they are, and which provides a procedure for taking care of those few instances when the memory reference is not available.

SUMMARY OF THE INVENTION

In accordance with the present invention, an improved data processing system and method of operation are provided which does not require the preliminary running of a check program to locate and then mark all memory references required during the operation of a program or special section of code in a program. The time spent in carrying out the preliminary memory reference check and marking of the references is saved, as well as the time spent after the run, in having to go back through the assigned storage to unmark all of the memory references.

In the operation of the data processing system, the assumption is made that all memory references to be requested by a section of a program are available in assigned memory locations. If that assumption proves incorrect, interrupt the running of the program and undo everything the special section of code has completed before the interrupt. Locate the needed memory reference in storage and write it into an assigned memory location, and restart the special section of code, supplying the needed memory reference when requested.

The improved data processing system is not dependent on a computer from any particular company. Any of the well-known data processing systems supplied by Data General Corporation, the assignee of the instant application, can be modified by the inventive software to carry out the present invention.

DETAILED DESCRIPTION OF THE PREFERRED EMBODIMENT

The Problem

Figure 1:
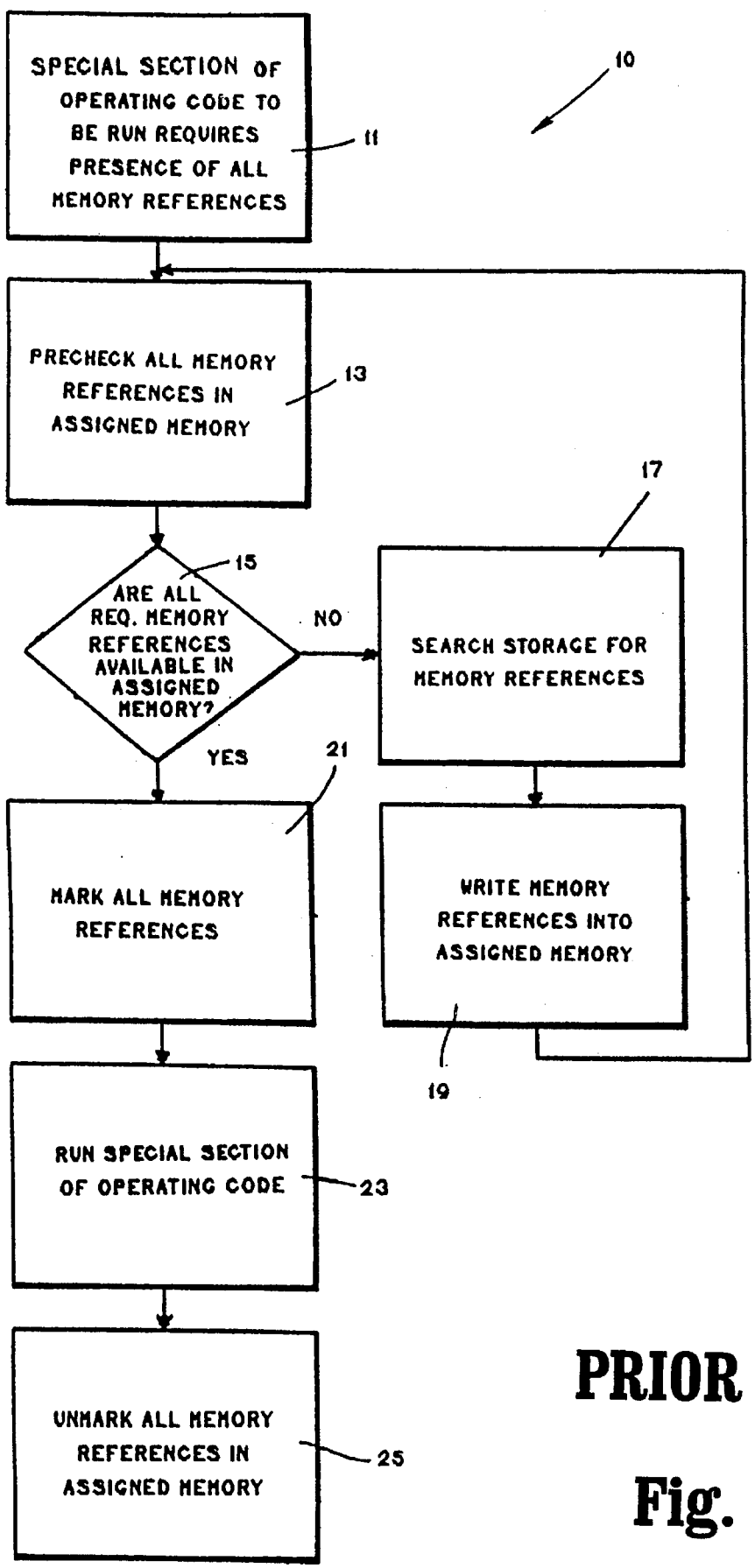
FIG. 1 is a program flow chart for the conventional solution for avoiding a page fault error in the absence of a needed memory reference.

The operating system in preparing to execute a special section of code that performs a series of operations that must either all be completed or not done at all. This code not be interrupted by a page fault in the middle of its execution because it could result in some but not all of the operations being performed. However, in performing the series of operations, this code will make memory references to pages that may not be resident and therefore could cause the disallowed page fault.

The Usual Solution

Before executing such a special section of code, the operating system prechecks the memory references that could cause page faults. The pages to which the references will be made are forced into memory if they are not already in memory, and they are marked so they cannot be removed from memory. (This operation is usually referred to as "wiring" or "locking" the pages into memory.) Then the special section of code is executed, assured that no page faults will occur, and that all of the series of operations will complete. When the special section of code completes, all the previously marked pages are unmarked so that they can again be removed from memory.

The problems with the usual solution are that: 1) it is slow; and 2) it is wasted effort in a large majority of cases. For most of these memory references, the page is already in memory and will not be removed from memory. The time to locate each page, mark it prior to executing the special code, and unmark after executing the special code is significant, especially since it is used to avoid a problem that occurs only in a small percentage of cases.

Before entering a special section of code 11 which requires the presence of all memory references to avoid a page fault condition, the operating system first prechecks the memory references at 13 that could cause page faults. If the memory reference is not in assigned memory, as shown by decision block 15, a search is made in storage 17 to locate the needed memory reference. When the memory reference is located, it is written into assigned memory storage at 19 and the flow chart then returns to block 13 for the precheck of all memory references to make sure they are all now resident in assigned memory. The flow chart again passes through the decision block 15 and the answer is "yes" that all memory references are now in assigned memory. All of the memory references are then marked or wired into memory so that the memory references cannot be erased before the special section of code is run. The special section of code is then run at 23. When this point in the process is reached, all of the memory references previously marked or wired into assigned memory are now unmarked at 25 and are allowed to be erased or moved from memory. In running the usual solution to the problem, a great deal of time is lost in prechecking the presence of all memory references, searching for and writing into assigned memory any that are missing, and then marking each one of the required memory references before the special section of code can even begin to run. After the special section has completed running, time is again lost going through all of the assigned memory locations unmarking all of the memory references so that that section of memory is again available to the operating system.

The New Solution

Figure 2:
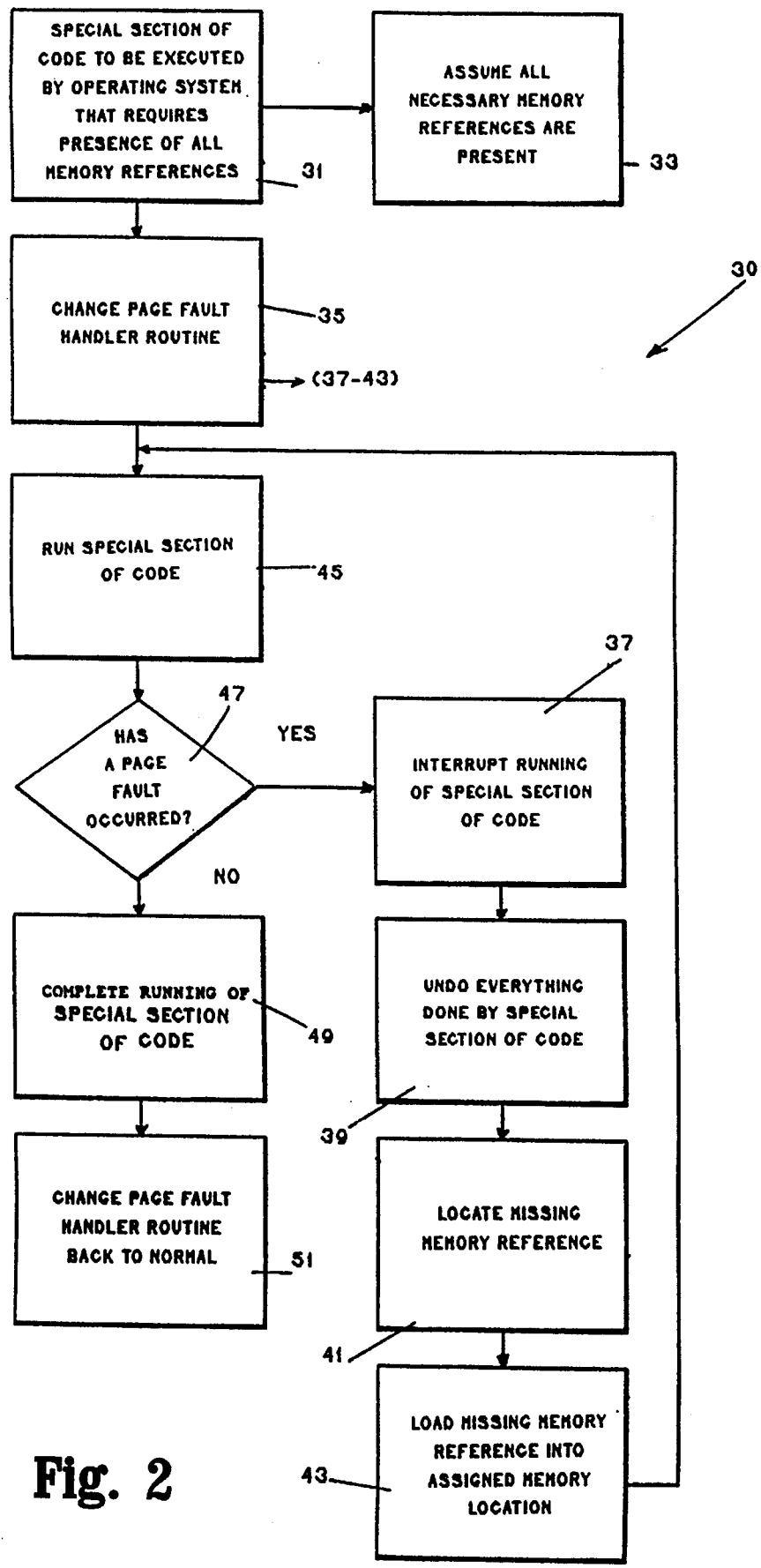
FIG. 2 is a flow chart of the improved data processing system of the present invention.

In accordance with the present invention, an assumption is made that all memory references needed by the program or special section of code are already in memory. Since more than 90% of the time this assumption is correct, no page fault will occur and substantial time is saved by not running the check program and having to mark the memory references before the program or special section of code is run and then having to again lose time having to go through assigned memory unlocking all of the memory references so that portion of memory is available to the operating system. Referring to FIG. 2, the improved operating system is shown and indicated generally by the number 30. Again, a special section of code to be executed by the operation system that requires the presence Of all memory references is held at 31 before being carried out. The assumption is made at 33 that all of the required memory references are available in assigned memory.

Before the operating system begins to run, the page fault handler routine is changed at 35 to accomplish the tasks set out in blocks 37–43 of the flowchart so that the system will not undergo a page fault if a memory reference is found missing. A conditional branch is added to the normal page fault handling routine. At decision block 47 the question is asked, "Has a page fault occurred?" If the answer is "Yes," the program branches to steps 37–43. The branch program path is followed each time an interrupt occurs until the program can pass decision block 47 with a "No" answer.

The most common occurrence will be for the special section of code to proceed through each step of the flowchart without a page fault occurring. The special section of code runs at block 45. No page fault occurs at 47 and the section of code completes running at 49. When finished, the page fault handler routine is returned to its normal condition at 51. If a page fault does occur while executing the special section of code, the modified fault handler routine would first interrupt the running of the program at 37, stopping and preventing the program from a crash. It then undoes everything already carried out by the special section of code so that there are no fragments of the operation of the code in existence. The missing memory reference is then sought at 41 and is loaded into an assigned memory location at 43. The special section of code is then started at 45 and the decision block 47 inquires whether a page fault has occurred. In the event a page fault does occur, then the answer at the decision block is "yes" and the program proceeds through steps 37, 39, 41, 43 and again returns to 45 and starts the program over again. It has been found to be much faster to risk having to erase portions of the program which have been carried out so that there is a clean slate in the computer, and then starting over again running from the beginning and even having to repeat this process if another memory reference is needed, rather than having to spend the unnecessary time, in most occurrences, of having to go through precheck, wire into memory each of the memory references, and then after the completion of the run of the special section of code, having to go through assigned memory unwiring or unmarking all of the memory references used to make that portion of memory again available to the operating system.

Returning to FIG. 2, after the special section of code has completed running at 49, the page fault handler routine is changed at 51 to return the operating system to its normal condition of operation in the event the next portion of the program or section of code will not need the same protection provided by the system of the present invention.

It is obvious from the above that the improved operating system of the present invention substantially reduces the time necessary in the carrying out of a program or special section of code which requires the presence of all memory references. By making the assumption that all of the references are present and then forging ahead, the program more often than not completes without the waste of time of having to go through assigned memory, finding the memory references and marking them, only to again, at the end of the run, go through assigned memory once more unmarking the references. The operating system of the present invention assumes everything is there and modifies the page fault handler routine so that in the rare occurrence that a memory reference is not present the system does not crash, but rather is interrupted, the slate is wiped clean, the memory reference is found, loaded into assigned memory, and the program is started over, saving a considerable amount of time.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

The embodiments of the invention in which an exclusive property or privilege is claimed are defined as follows:

1. A computer-implemented method of operating a program which includes a special section of code comprising a plurality of steps in a data processing system, comprising:

starting operation of the special section of code, and when a memory reference is required for operation of the special section of code, requesting the required memory reference from an area of memory assigned for operation of the special section of code; if the memory reference is available in the assigned memory, providing access to the requested memory reference and continuing the operation of the special section of code, and if the memory reference is unavailable indicating a defined condition without retrieving the missing memory reference from secondary storage; wherein the operation of the special section of code is started without checking for the availability of the memory references; and, in response to the defined condition indicating non-availability of the memory reference, by:

(i) interrupting the operation of the special section of code;

(ii) undoing whatever steps the special section of code had done since the start of the operation of the special section of code up to the interrupt;

(iii) locating the required memory reference in storage, reading the memory reference from storage, and writing the memory reference to the assigned memory area; and (iv) restarting the operation of the special section of code;

whereby a fault condition due to the non-availability of the memory reference is prevented.

2. The machine method according to claim 1, in which the undoing comprises reversing each of the steps of the special section of code in the reverse order to their normal operation.

3. The machine method according to claim 1 in which the defined condition is a fault condition.

4. The machine method according to claim 3, in which the defined condition is a page fault condition.

5. The machine method according to claim 3, in which the interrupting and the undoing are carried out by a modified fault routine.

6. The machine method according to claim 5, in which, after running of the special section of code is completed, the fault routine is returned to its unmodified condition.

7. A data processing system for operating a program which includes a special section of code including a plurality of steps, comprising:

means for running the program;

means for requesting a memory reference required for operation of the special section of code in the program from an area of memory assigned for operation of the special section of code, and, if the memory reference is available in the assigned memory, providing access to the requested memory reference and continuing the operation of the special section of code, and if the memory reference is unavailable indicating a defined condition without retrieving the missing memory reference from secondary storage; wherein the means for running the program starts the special section of code without checking for the availability of the memory references; and means responsive to the said defined condition indicating the non-availability of the memory reference, including:

(i) means for initiating an interrupt of the operation of the special section of code;

(ii) means for undoing whatever steps the special section of code had done since the start of the operation of the special section of code up to the interrupt;

(iii) means for locating the required memory reference in storage, reading the memory reference from storage, and writing the memory reference to the assigned memory area; and (iv) means for restarting the operation of the special section of code.

8. The data processing system according to claim 7, in which the means for undoing includes means for reversing each of the steps in the special section of code in the reverse order to their normal operation.

9. The data processing system according to claim 7, in which the defined condition is a fault condition.

10. The data processing system according to claim 9, in which the defined condition is a page fault condition.

11. The data processing system according to claim 9, in which the interrupting and the undoing are carried out by a modified fault routine.

12. The data processing system according to claim 11, in which, after running of the special section of code is completed, the fault routine is returned to its unmodified condition.

13. In a computer system having assigned storage and secondary storage, a method of executing a special section of code which performs a series of operations that must all be completed without interruption by a page fault during execution, thereby requiring all memory references to be in assigned storage at one time, including:

executing the special section of code including requesting memory references and determining if a requested memory reference is not available in assigned storage;

indicating if a requested memory reference is not available in assigned storage during said executing without retrieving the missing memory reference from secondary storage;

inquiring whether any requested memory reference was not available in assigned storage;

performing steps to avoid an error resulting from partial execution of the special section of code if it is determined that at least one requested memory reference was not available in the assigned storage during code execution and was thereby not retrieved;

retrieving missing memory references from storage and writing the memory references to assigned memory; and restarting execution of the special section of code.

14. The method of executing a special section of code in claim 13 wherein said performing steps to avoid an error includes undoing whatever steps the special section of code had done since the start of the execution of the special section of code up to the interrupt.

15. The method of executing a special section of code in claim 13 wherein said performing steps to avoid an error are carried out by a modified page fault handler.

16. The method of executing a special section of code in claim 13 wherein said executing a special section of code is started without checking for the availability of the memory references.

* * * * *